Oct. 11, 1966  J. A. CLARK  3,278,738
LIGHT DEFLECTOR
Filed Jan. 2, 1964
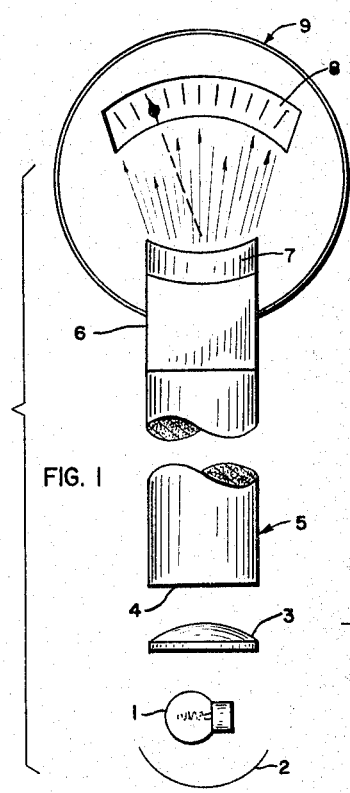
FIG. 1
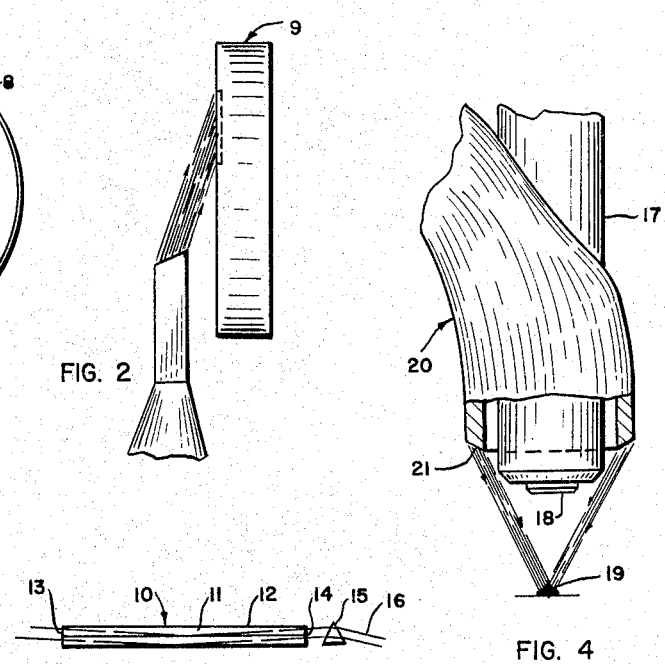
FIG. 2
FIG. 3
FIG. 4
FIG. 9
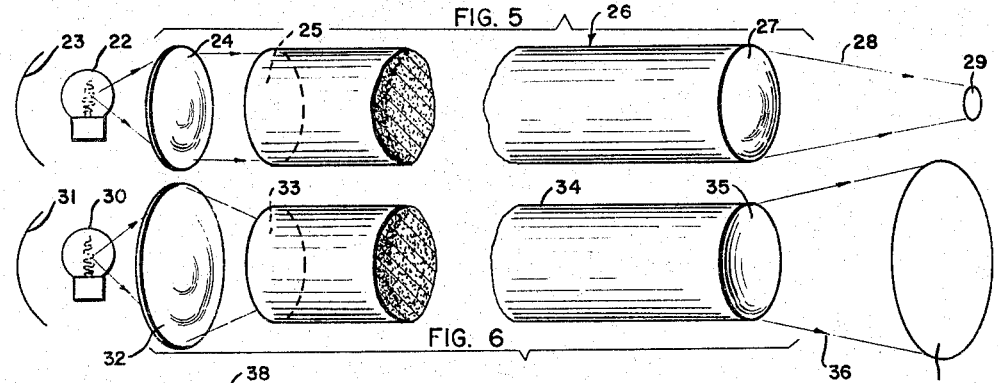
FIG. 5
FIG. 6
FIG. 7
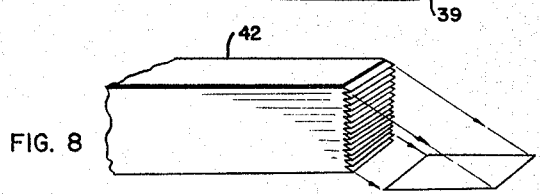
FIG. 8
JAMES A. CLARK
INVENTOR.
BY
ATTORNEYS United States Patent Office 3,278,738
Patented Oct. 11, 1966

3,278,738
LIGHT DEFLECTOR
James A. Clark, Brighton, N.Y., assignor to Bausch & Lomb Incorporated, Rochester, N.Y., a corporation of New York
Filed Jan. 2, 1964, Ser. No. 335,165
1 Claim. (Cl. 240—2)

This invention relates to an illuminator and more particularly to a light deflector.

Illuminators of various types have been used for illuminating objects in microscopes, meter dials, counters, and various other devices requiring illuminators. Certain problems arise, such as heat which is present in most any light source, limited space for light source, and shadows caused by the illumination etc. These inherent problems with the conventional light source may be overcome through the use of an optical fiber bundle comprising a plurality of small diameter fibers. The light transmitted through the bundle is to a certain degree collimated and its efficiency of transmission is improved by coating each of the fibers. By controlling to a degree the collimation of the light as it passes through the bundle a better control of the direction of light projection on the terminal end surface by shaping the end of each fiber is possible. This shape may be any surface which deviates the rays as they emerge from the surface and are projected on the illuminated area.

It is an object of this invention to provide a specially shaped surface on the end of a light transmitting bundle of fibers to deflect the luminous flux as desired.

It is another object of this invention to shape the end surface of a light transmitting bundle of fibers to control the intensity of the luminous flux emerging from the bundle.

It is a further object of this invention to shape the terminal end surface of a light transmitting bundle of fibers to control the illumination of an area caused by the luminous flux projected from the end surface.

The objects of this invention are accomplished by shaping the end surface of a bundle of fibers in the manner to deviate the rays as they emerge from the end of each of the fibers forming the bundle. The end surface may be mechanically retained or bonded to maintain the fixed relative position of each of the fibers forming the end surface of the bundle. The bonding of the fibers must be rigid to permit formation of an optical surface on the end of the bundle. Each of the fibers transmitting light to the end surface has a predetermined surface relationship to the adjacent fiber to cause a controlled deviation of light rays projected from the end surface. The illumination will be confined to a specific area to cause the predetermined intensity and area of illumination with a minimum of heat. The light may be projected in any direction with a suitable end surface which adapts itself to use with the type of instrument used.

FIG. 1 illustrates a bundle of fibers illuminating the dial of a meter.

FIG. 2 illustrates a side view of the illumination of the dial.

FIG. 3 illustrates a plurality of fibers and the transmission of light through the fibers by internal reflection.

FIG. 4 illustrates a bundle of fibers forming a ring around the objective of a microscope for illuminating the object.

FIG. 5 illustrates a convex lens shape formed on the front of the bundle.

FIG. 6 illustrates a concave surface for diverging the light rays.

FIG. 7 illustrates a cone shaped end piece converging the light along an axial line.

FIG. 8 illustrates a means of deflecting a luminous flux from a plurality of beveled surfaces.

FIG. 9 illustrates a modification of an end surface on a bundle of fibers.

Referring to FIG. 1 a light source 1 and a mirror 2 direct a luminous flux through the lens 3. A light receiving surface 4 is formed on the bundle 5. The end portion 6 of the bundle 5 is formed in a manner whereby each of the plurality of fibers are fixed in a relative position to each other. It is imperative that the means fixing the fibers does not permit any movement of the fiber ends during the surfacing operation. With a rigid bonding agent it is possible to form a smooth terminal end surface 7 on the bundle of fibers.

The terminal end surface 7 as illustrated is curved across its face from left to right. The surface 7 has a flat edge as viewed in FIG. 2. The light emerging from the surface 7 is deflected in a fan-shaped array as indicated in FIG. 1. This fan-shaped array projects on the face 8 of the meter 9. As viewed in FIG. 2 the luminous flux is deflected back against the meter face thereby illuminating the dial by positioning the end of a fiber bundle proximate the lower portion of the meter 9.

FIG. 3 illustrates two fibers which simulate the principle of light transmission in the fibers of a bundle. The fibers 10 have a very small diameter and may be formed of glass. The core 11 of each of the fibers is formed of a glass of higher index of refraction than the coating 12 which encases the core of the fiber. Each of the fibers are optically insulated from each other by the coating formed on each of the fibers. The light entering the end 13 is reflected internally from side to side at a frequency depending on the curvature of the fiber and angle of entrance. The light emerges from the end 14 in a partially collimated manner relative to other fibers which form the bundle. The light projected into the entrant end 13 of the fibers is preferably collimated however, it may be focused on the entrant end on a small area to thereby concentrate the light and increase the intensity of the flux passing through the fibers. The requirement of the angle made by the light project on the entrant end is that the light is directed on the surface within the acceptance angle of the glass forming the fiber. This acceptance angle is dependent upon the refractive index of the core glass.

For the purposes of illustration a minute prism 15 is positioned axially aligned with the fibers 10. It is well known in the theory of light that a prism will deviate a light ray as it passes through the prism. It is true that the various wavelengths are dispersed relative to each other although for the purpose as described in this disclosure the deviation is immaterial because light from adjoining fibers overlap as the luminous flux is projected on the illuminated area. The deviation of the rays 16 is in the direction of the heavy portion of the glass because the light travels farther in the lower portion than the upper portion of the prism. Any shape of the end surface may be used and the deviation of the rays are controlled by the variation in the length of the ray path in the prism relative to adjacent rays. The luminous flux may be deviated in a manner to increase or decrease the intensity of illumination on the illuminated area. FIGS. 1 and 2 illustrates a compound curvature causing a divergent of the rays as viewed in FIG. 1 and a mere deflection of the light rays as viewed in FIG. 2.

FIG. 4 illustrates a device adapted for use for illuminating the object on a microscope. A microscope barrel 17 includes an objective lens 18 for viewing an object 19. The light passing through the bundle 20 emerges through the beveled surface 21 and is deflected radially inward as it is projected downward and increases the intensity of the illumination on the object 19. One very definite advantage of this type of illumination is that the increase in flux density does not create excessive heat on the object which can be a disadvantage where the object is organic.

FIG. 5 illustrates a light source 22 and a reflector 23 directing a luminous flux through the lens 24 which is collimated and projected on the light receiving surface 25. The bundle of fibers 26 is formed with a convex surface 27 projecting light to increase the intensity of the luminous flux 28. The degree of intensity of the illuminated area 29 may be controlled by moving the bundle 26 to and from the illuminated area 29. As mentioned before the intensity does not build up the heat factor as would ordinarily be true of a common condenser assembly.

FIG. 6 illustrates a source 30 and reflector 31 wherein the light is focused by the lens 32 and projected on the surface 33. The light passes through the bundle 34 and is diverged by a concave terminal end surface 35. The divergence of the luminous flux 36 decreases the intensity of illumination on the illuminated area 37. This type of operation adapts itself well to a place where limited space is available for an illuminator. The concentration of a light passing through the bundle 34 is increased by sharp focusing on the entrant end 33 of the bundle.

FIG. 7 illustrates a bundle of fibers which is adapted for receiving a luminous flux in a manner as illustrated in FIGS. 5 or 6. The bundle 38 has a cone shaped end surface which causes a varying shape for the illuminated area. The light in the illuminated area 40 is concentrated and the illuminated area 41 is ring-shaped to illuminate an area surrounding a dark center portion.

FIG. 8 illustrates a bundle 42 which is adapted for receiving a luminous flux as illustrated in FIGS. 5 and 6. The emergent end surface is formed in a saw-tooth manner with planes running cross-wise to project a deviated beam of light. The light projected from the bundle 42 is not changed in intensity but merely deviated at a angle to the axis of the bundle 42.

FIG. 9 illustrates a modification having annular concentric curved surfaces 50, 51 and 52 formed on the end of the bundle to control the deflection of the light emergent from the bundle. The fibers may be in ring layers equal to the number annular surfaces or constructed with a number of layers forming each of the curved surfaces.

The operating of the device illustrated will be described in the following paragraphs.

Referring to FIGS. 1 and 2 the source of light 1 and the reflector 2 projects the light through the lens 3 which directs the light on the surface 4 of the bundle of fibers 5. The light directed on the surface 4 need only be within the acceptance angle of the fiber material forming the optical fibers in the bundle 5. A collimated light will direct the light lengthwise through the bundle however, the efficiency of transmission of light is largely dependent on the reflectance of the coating material on each of the fibers to reflect the light laterally across the fibers as it is transmitted through the length of the fiber in the bundle.

The glass fibers must be of a small diameter to maintain a substantial collimation of light throughout the length of the bundle. When the light emerges through the surface 7 the light is substantially collimated and with a surface formed so that each of the fibers form a continuation of the surface with no irregularities the surface is capable of deflecting the beam as indicated. It is necessary that the surface be smooth in order that the light rays are all deflected in a controlled manner. Irregularities on the fiber surfaces will cause diffusion and loss of efficiency as the luminous flux is deflected. The light passing through the end portion 6 of the bundle of fibers is deflected in a manner similar to light deflected by a prism or lens. FIG. 2 illustrates the beam deflected to illuminate the dial 8 of the meter 9.

FIG. 4 illustrates a bundle of fibers which are adapted for receiving light from an input end not shown but similar to that of FIGS. 1 and 2. The output end of the bundle 20 forms an annular ring with a beveled end. The end portion causes a deflection of the total beam radially inward to overlap and form a spot of light immediately under the objective lens 18 of the microscope. The intensity of the illuminated area is greatly increased by the deflection of the light beam to cover a small area as indicated.

FIGS. 5, 6, 7, 8 and 9 illustrate various means for increasing or decreasing the intensity of the luminous flux as it is projected on an illuminated area. The intensity is controlled by the deviation of the light rays to impinge on a more concentrated or a less concentrated area. The luminous flux as illustrated in FIG. 8 is deviated only.

The preferred embodiment of this invention has been illustrated and described. It is understood that modifications of this invention might be devised which would fall within the scope of the attached claim.

I claim:

An illuminating means comprising a bundle of light transmitting fibers having a light receiving surface, a light source projecting light on said light receiving surface, a hollow cylindrical terminal end portion on said bundle mounted on and surrounding a microscope objective, a radially beveled end surface constructed and arranged for converging light rays in axial alignment with the microscope objective thereby controlling deviation and intensity of the light projected from said end surface to provide a predetermined flux density and central area of illumination.

References Cited by the Examiner

UNITED STATES PATENTS

| 1,751,584 | 3/1930 | Hansell | 240—1 |
| 2,130,494 | 9/1938 | Heine | 88—40 |
| 2,344,370 | 3/1944 | Shapiro | 240—6.46 |
| 2,480,178 | 8/1949 | Zinberg | 240—1 |
| 2,525,414 | 10/1950 | Kleinschmidt | 240—6.46 |
| 3,058,021 | 10/1962 | Dunn | 88—1 X |
| 3,088,037 | 4/1963 | Baum | 88—1 X |
| 3,131,690 | 5/1964 | Innis et al. | 240—1 X |
| 3,166,623 | 1/1965 | Waidelich | 128—6 X |

OTHER REFERENCES

Kapany, N. S.: Fiber Optics, in Concepts of Classical Optics, by Strong, Appendix N, W. H. Freeman and Company, San Francisco, 1958.

Hopkins, H. H. et al.: Transparent Fibers for the Transmission of Optical Images, in Optica Acta, vol. 1, No. 4, February 1955.

Nicoll, F. H.: Mural Television Display Using Fiber Optics, in RCA TN No. 188, received in U.S. Patent Office, September 1958.

NORTON ANSHER, *Primary Examiner.*

JOHN M. HORAN, *Examiner.*

J. F. PETERS, *Assistant Examiner.*